(12) United States Patent
MacAuslan

(10) Patent No.: US 7,711,529 B2
(45) Date of Patent: *May 4, 2010

(54) DETERMINING A TANGENT SPACE AND FILTERING DATA ONTO A MANIFOLD

(75) Inventor: Joel M. MacAuslan, Nashua, NH (US)

(73) Assignee: Speech Technology and Applied Research Corporation, Bedford, MA (US)

( * ) Notice: Subject to any disclaimer, the term of this patent is extended or adjusted under 35 U.S.C. 154(b) by 112 days.

This patent is subject to a terminal disclaimer.

(21) Appl. No.: 11/581,952

(22) Filed: Oct. 16, 2006

(65) Prior Publication Data

US 2007/0038420 A1    Feb. 15, 2007

Related U.S. Application Data

(63) Continuation of application No. 10/662,991, filed on Sep. 15, 2003, now Pat. No. 7,124,065, which is a continuation-in-part of application No. 09/425,784, filed on Oct. 25, 1999, now abandoned.

(60) Provisional application No. 60/105,690, filed on Oct. 26, 1998.

(51) Int. Cl.
    *G06F 17/10* (2006.01)
(52) U.S. Cl. ............................... 703/2; 700/28; 700/29; 700/31; 702/108
(58) Field of Classification Search ..................... 703/2; 700/28, 29, 31; 702/108, 109
    See application file for complete search history.

(56) References Cited

U.S. PATENT DOCUMENTS 4,918,742 A    4/1990 Simonds
4,973,111 A    11/1990 Haacke et al.

(Continued)

FOREIGN PATENT DOCUMENTS

EP    0 421 566 A2    4/1991

OTHER PUBLICATIONS

Abraham, R.H., et al, "Dynamics, The Geometry of Behavior," Part Two: "Chaotic Behavior," 1983, *Aerial Press*, Santa Cruz, second edition Addison-Wesley, pp. 688-689(1992).

(Continued)

*Primary Examiner*—Kamini S Shah
*Assistant Examiner*—Herng-Der Day
(74) *Attorney, Agent, or Firm*—Hamilton, Brook, Smith & Reynolds, P.C.

(57) ABSTRACT

A technique for determining the number of constraints on, or topological dimension of, a set of input data produced by a nonlinear system, such as a pathological vocal or econometric system. The technique characterizes the tangent space about a predetermined base point by identifying a maximal set of non-redundant nonlinear fits to the data. It needs only a few data points and only assumes that the functional form of the true constraints is smooth. Each fit is equivalent to a set of contours, with the data lying along the zero-value contour. For each fit, the gradient at the base point in the uphill direction identifies the constraint direction. The number of linearly independent constraint directions provides the number of constraints near the base point. The remaining unconstrained directions define the tangent space, which has a dimensionality equal to the number of linearly independent unconstrained directions.

20 Claims, 6 Drawing Sheets

U.S. PATENT DOCUMENTS

| | | | |
|---|---|---|---|
| 5,453,940 | A | 9/1995 | Broomhead et al. |
| 5,493,516 | A | 2/1996 | Broomhead et al. |
| 5,519,605 | A | 5/1996 | Cawlfield |
| 5,835,682 | A | 11/1998 | Broomhead et al. |
| 6,094,601 | A | 7/2000 | Popovich |
| 7,124,065 | B2 * | 10/2006 | MacAuslan .................... 703/2 |

OTHER PUBLICATIONS

Shepard, R.N., et al, "Parametric Representation of Nonlinear Data Structures," pp. 561-592, c. 1967(publisher unknown).

Fukunaga, K., et al, "An Algorithm for Finding Intrinsic Dimensionality of Data," *IEEE Transactions on Computers*, pp. 176-183, vol. C-20, No. 2 (Feb. 1971).

Trunk, G.V., "Statistical Estimation of the Intrinsic Dimensionality of a Noisy Signal Collection," *IEEE Transactions on Computers*, pp. 165-171, vol. C-25, No. 2, (Feb. 1976).

Bennett, R.S., "The Intrinsic Dimensionality of Signal Collections," *IEEE Transactions on Information Theory*, pp. 517-525, vol. 1T-15, No. 5, (Sep. 1969).

Schwartzmann, D.H., et al, "An Algorithm for Determining the Topological Dimensionality of Point Clusters," *IEEE Transactions on Computers*, pp. 1175-1182, vol. C-24, No. 12 (Dec. 1975).

Yang, W., et al, "Preserving Chaos: Control Strategies to Preserve Complex Dynamics with Potential Relevance to Biological Disorders," *The American Physical Society*, pp. 102-110, vol. 51, No. 1 (1995).

Broomhead, D.S., et al, "Topological Dimension and Local Coordinates from Time Series Data," *J. Phys. A: Math. Gen.* 20 (1987) L563-L569. Printed in the UK.

Biglieri, E., et al, "SVD Algorithms and Their Application to Digital Signal Processing," *Proceedings of ISCAS 85*, pp. 1399-1402 (1985).

Bajaj, C., "Higher-Order Interpolation and Least-Squares Approximation Using Implicit Algebraic Surfaces," *ACM Transactions on Graphics*, vol. 12, No. 4, Oct. 1993.

Sherbrooke, N., "Computation of a Medial Axis Transform of 3-D Polyhedra," *Solid Modeling 95*, ACM 0-89791-672-7/95, 1995.

Dumortier, F., "On the Decidability of Semi-Linearity for Semi-Algebraic Sets and its Implications for Spatial Data Bases," *PODS 97*, ACM-0-89791-910-6/97/05, 1997.

Richardson, D., "A Simplified Method of Recognizing Zero Amoung Elementry Constants," *ISSAC's 95*, ACM 0-89791-699-9/95/0007, 1995.

Malik, J., "Computing Local Surface Orientation and Shape from Texture for Curved Surfaces," *International Journal of Computer Vision*, 1997.

* cited by examiner

DETERMINING A TANGENT SPACE AND FILTERING DATA ONTO A MANIFOLD

RELATED APPLICATIONS

This application is a continuation of U.S. application Ser. No. 10/662,991, filed Sep. 15, 2003 now U.S. Pat. No. 7,124,065, which is a continuation-in-part of U.S. application Ser. No. 09/425,784, filed Oct. 25, 1999 now abandoned, which claims the benefit of U.S. Provisional Patent Application No. 60/105,690 filed Oct. 26, 1998, the entire teachings of which are incorporated herein by reference.

STATEMENT OF GOVERNMENT INTEREST

This invention was supported, at least in part, by contract number R44-DC 02343 with the United States' National Institutes of Health, who may have certain rights in this invention.

FIELD OF THE INVENTION

The present invention relates to analysis of nonlinear dynamical systems and in particular to a technique for determining the number of constraints, or equivalently the topological dimension, for a set of data.

BACKGROUND OF THE INVENTION

Certain practical applications of data processing systems relate to fitting models to sets of data. For example, in applications such as speech processing, signal processing, econometric data prediction, demographic analysis and the like, a set of data points are first collected from a real world process. It is desired then to find a set of mathematical equations which can be used to model the process accurately, for example, to predict the future behavior of the real-world system.

Determining the number of dimensional constraints on the collected data, or equivalently the topological dimension, $d_T$, is an important problem in the study of nonlinear system responses. For example, three-coordinate data may fill a volume, lie on a surface, be confined to a curve, or even degenerate to a point, reflecting zero, one, two, or three independent constraints (representing a topological dimension, $d_T$, of three, two, one, or zero, respectively). In the case of a real-world system in which linear responses may be assumed, this problem is able to be robustly solved by matrix decomposition techniques such as Singular Value Decomposition (SVD) or eigenvalue decomposition. These modeling methods assume that linear functions will adequately fit the data. However, such linear techniques cannot generally be directly applied to an instance of a nonlinear system with satisfactory results.

SUMMARY OF THE INVENTION

The present invention is a significant extension of Singular Value Decomposition (SVD) and eigenvalue decomposition techniques and robustly determines the constraints on experimental data without prior assumptions about their functional form. This strongly distinguishes it from "curve-fitting", in which the functional form is assumed and the data serve merely to determine some free parameters of the fit to the form. The method's essence is to characterize a "tangent space" at a base point as a simultaneous collection of all linear fits that best describe the immediate neighborhood of the point. The technique works for both clean and noisy data, applies to complicated curving and twisting constraints (e.g., abstract shapes or "geometries" of data), and requires only a modest number of data samples as input. It also accommodates prior knowledge, either positive or negative, about constraints.

More particularly, the technique relies on two principal process steps. First, an SVD process is used to identify a maximal set of non-redundant fits to the data, preferably single-constraint fits, all centered about some convenient "base" point. Each fit is equivalent to a set of contours (lines, surfaces, etc.), with the data themselves all lying along the zero-value or perfect-fit contour. The gradient of each fit at the base point, e.g., the "uphill" direction across the contours, identifies each constrained direction. The number of such directions that are linearly independent thus provides exactly the number of constraints in the neighborhood of the base point. Consequently, the directions (if any) that remain unconstrained also define the tangent space.

The fits found by the SVD process must then pass a statistical significance test, i.e., they are suppressed to the extent that even unconstrained data might frequently produce them. However, imperfect fits are accepted to the extent that measurement errors in the data could cause them. Care in evaluating the significance of the statistics allows both (a) fitting shapes that can be as complicated as the data can meaningfully describe, yet (b) accommodating measurement error.

Once the tangent space is found, it is a straightforward matter to project additional data points near the base point onto it, thus enforcing the constraints. The degree of mismatch (i.e., of constraint violation) provides a measure of the process noise, if this is not initially well known.

The method has been tested empirically on several data sets. It is also applied to one "higher-level" problem, to determine $d_T$ for strongly spatially varying geometry that can in some places mimic additional (false) constraints, with potentially severe consequences to analyzing, e.g., chaotic dynamical systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

1. An Exemplary Analysis Environment

Figure 1:
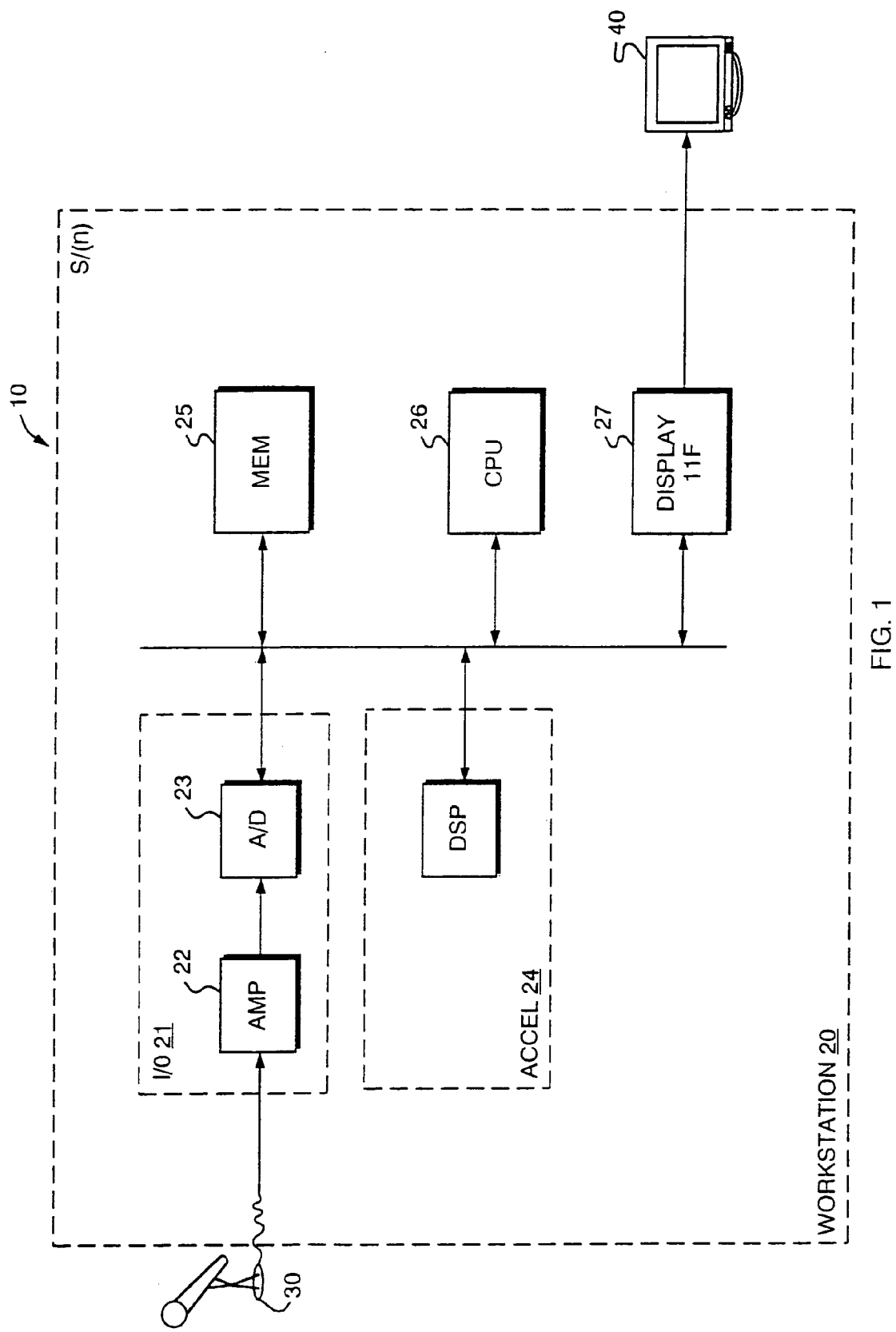
FIG. 1 is a block diagram of the components of a data processing system in which a technique for determining a tangent space and filtering data onto a manifold may be implemented.

Turning attention now to the drawings more particularly, a preferred embodiment of one particular application of the invention to characterization of laryngeal dynamics will be described in greater detail. The system 10 consists of a computer workstation 20, a microphone 30, and display 40. The workstation 20 includes components typical of a data processing system of the personal computer type, including a digital signal input/output card 21 consisting of a signal amplifier 22 and analog-to-digital converter 23, a processor accelerator board, such as one including a digital signal processor (DSP) 24, memory 25, a central processing unit (CPU) 26, and display interface 27.

In operation, speech signals are first picked up by the microphone 30 and fed to the amplifier 22 and analog-to-digital converter 23. A time sequence of the signal samples from the converter 23 is then stored as an array, S(n), in the memory 25, where n is a predetermined number of signal samples. The central processing unit 26 then processes the samples, S(n), either with its own internal arithmetic units or in cooperation with the digital signal processor 24.

This particular end use is illustrated herein by way of example. It should be understood that the invention can be applied to other applications in which characterization of a non-linear dynamical system is desired.

2. Overview of the Process

Figure 2:
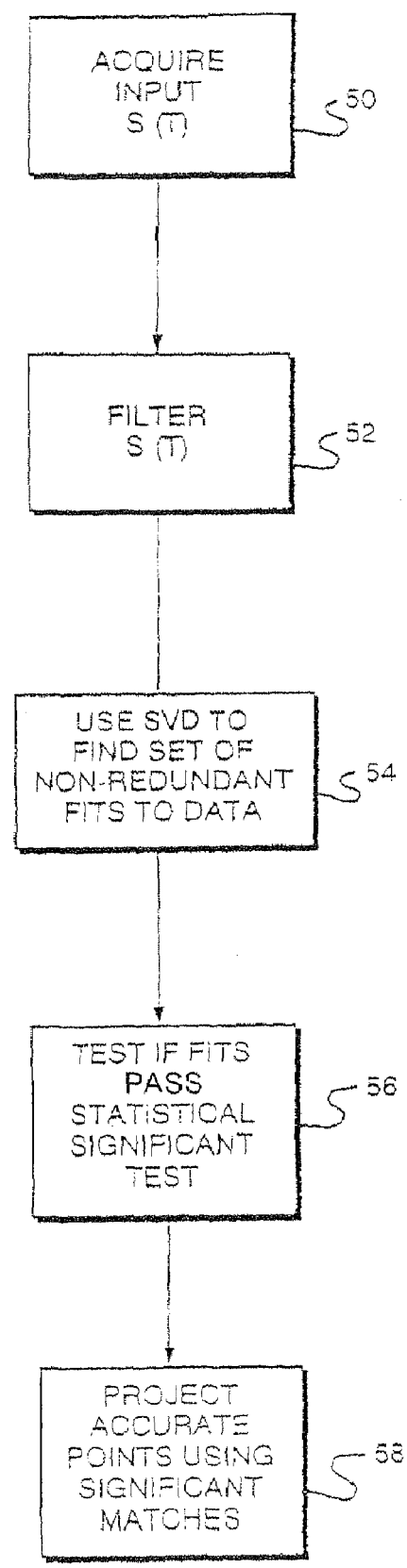
FIG. 2 is a flow diagram of a sequence of process steps which implement the technique.

In general, the present technique attempts to fit one or more constraints to the data, which are assumed not to fit any predefined function perfectly. As shown in FIG. 2, the data are acquired in a first step 50 and then filtered in a next step 52. In step 54, a matrix decomposition technique such as Singular Value Decomposition (SVD) is then used to identify a set of non-redundant fits to the data, preferably single-constraint fits, all centered about a convenient "base" point. Next, in step 56, a tangent space is defined by determining if each fit passes a statistical significance test. Fits which do pass the statistical significance test serve collectively to define the manifold near the base point. They may be used to project additional data points in the neighborhood of the base point, effecting a filtering of the additional points onto the manifold, in step 58. In steps 56 and 58, the idea is to find the intrinsic dimensionality of the data S(n) and the local tangent space at a specified base point.

A detailed program listing of one implementation of the process is included in the attached Appendix.

3. Introduction to Detailed Process Description

I. Finding Single-Constraint Manifolds Through the Data

Construction of the Design Matrix

As mentioned above, a first step is to find a base point and N other data points in the neighborhood of the base point. Next, an N-by-N square matrix is constructed by evaluating N linearly independent basis functions for each of the N points found.

For example, if 6 points are found in the neighborhood of a base point in a two-dimensional (xy) space, then 6 basis functions can be evaluated for each point found. These basis functions could be chosen to be all of the two-dimensional polynomials up through order 2, i.e., 1 (constant);

x, y (linear terms) ; and $x^2$, xy, $y^2$ (quadratic terms).

If 10 points are found, the basis functions could be chosen to be all of the two-dimensional polynomials up through order 3, i.e., what we have already found through order 2, plus the four new functions:

$x^3, x^2y, xy^2, y^3$ (cubic terms)

The basis functions can be, but need not be, polynomials.

In general, the N-by-N square matrix (called the "design matrix") is of the form $$\begin{matrix} f_1(P_1) & f_2(P_1) & \ldots & f_N(P_1) \\ f_1(P_2) & f_2(P_2) & \ldots & f_N(P_2) \\ \ldots & & & \\ f_1(P_N) & f_2(P_N) & \ldots & f_N(P_N) \end{matrix},$$

where $f_1( ) \ldots f_N( )$ are the N basis functions chosen and $P_1, P_2, \ldots, P_N$ are the N points found in the given neighborhood.

For 6 points found and basis functions of 1, x, y, $x^2$, xy, and $y^2$, we would have the design matrix $$\begin{matrix} 1 & x_1 & y_1 & x_1^2 & x_1y_1 & y_1^2 \\ 1 & x_2 & y_2 & x_2^2 & x_2y_2 & y_2^2 \\ 1 & x_3 & y_3 & x_3^2 & x_3y_3 & y_3^2, \\ \ldots & & & & & \\ 1 & x_6 & y_6 & x_6^2 & x_6y_6 & y_6^2 \end{matrix}$$

where $(x_1, y_1)$ is $P_1$, $(x_2, y_2)$ is $P_2, \ldots$.

Decomposition of the Design Matrix to Identify Constraint Equations

Having constructed an N-by-N design matrix, we now use standard matrix decomposition techniques, such as singular value decomposition ("SVD") or eigenvalue decomposition, to identify linear combinations of the basis functions that combine to yield something that is essentially 0 when evaluated at each of the N points found. (SVD is performed directly on the design matrix D, whereas eigenvalue decomposition is performed on $D^TD$. "Essentially 0" is specified more precisely below.)

Symbolically, we say that we want to find vectors of coefficients of the form $C=(C_1, C_2, \ldots, C_N)$, such that $f(P_j) \equiv \Sigma_{i=1}^{N} C_i f_i(P_j) \approx 0$ for the N points $P_j$ (j=1 ... N) found in the neighborhood.

If we find an equation of the form $f(P_j) \equiv \Sigma_{i=1}^{N} Ci\ fi(P_j) \approx 0$ $\forall j$, we say that this represents a constraint equation relating the data.

For example, if we have 6 xy data points lying on a circle of radius 1 and satisfying the equation $x^2+y^2=1$, we can write this as the constraint equation $f(x,y) = -1 + x^2 + y^2 =$
$0 \Rightarrow -1 + 0*x + 0*y + 1*x^2 + 0*xy + 1*y^2 = 0 \Rightarrow (1, x, y,$
$x^2, xy, y^2) \cdot (-1, 0, 0, 1, 0, 1)^T = 0$ in matrix form.

Here we have found a vector of coefficients $C = (-1, 0, 0, 1, 0, 1)$, with $C_1 = -1, C_2 = 0, \ldots$.

Vectors of coefficients ("singular/eigen-vectors" [which are actually unit vectors, unlike the example above]) corresponding to constraint equations are found by first identifying associated singular values or eigenvalues that are essentially 0. These could be identified in various ways (e.g., by Monte Carlo or symbolically); the following "input/output" analysis is particularly efficient and straightforward.

Input/Output Sensitivity Analysis for Constraint Equations

In general, singular (or eigen-) values will not be exactly 0, but if they are relatively small compared to the uncertainties in their values, then they can be considered to be effectively 0.

The uncertainties in the singular/eigen-values are determined by perturbing the data points $P_j$ by small amounts consistent with the stated level of noise on the data and by then seeing how this affects the singular/eigen-values found for the design matrix constructed from the perturbed points. For example, if the perturbation is done on an individual point-by-point and component-by-component basis (a Monte-Carlo approach involving simultaneous perturbation of all of the points is another possibility), then we can first add the stated level of noise $\sigma$ to the first component of $P_1$, so that $$f_1(P_1)\ f_2(P_1)\ \ldots\ f_N(P_1)$$

in the first row of the matrix is replaced by $$f_1(P_1 + \hat{x}\sigma) f_2(P_1 + \hat{x}\sigma) \ldots\ f_N(P_1 + \hat{x}\sigma).$$

Then, new singular/eigen-values are calculated for the new design matrix, and these are compared with the corresponding values for the original design matrix to determine the effect on these values of a specified perturbation of the first component of the first point $P_1$.

This procedure is repeated for a perturbation of the second component of $P_1$, a perturbation of the first component of $P_2$, and so on. Finally, after the effects of all of these individual perturbations have been determined in isolation, the overall uncertainty in the singular/eigen-values (specifically, the covariance matrix of the variations) is determined in a statistically appropriate manner.

Additional Screening to Compensate for Chance Occurrences of Apparent Constraints on the Data Before qualifying singular/eigen-values as being essentially 0 relative to their associated uncertainties, a final statistical screening has to be applied to compensate for the fact that chance alone will result in a certain number of values being small, with this number increasing as the number of data points in the problem, i.e., value of N, increases. Only after comparing the observed ratios of singular/eigen-values to their associated uncertainties with a theoretical distribution of values corresponding to the same noise and number of degrees of freedom, is it possible to say that observed values are really effectively 0. Given the number of coordinates and points in even the most trivial nonlinear problem (2 coordinates, 6 points), it is reasonable to approximate the effect of virtually any plausible distribution of measurement errors as producing a Gaussian distribution of eigenvalue errors, and a Chi-squared distribution of their squares (which are used to compute the singular values). Thus, very standard statistical significance tests may be used to decide whether a given singular value with its uncertainty (as determined above) can be identified as "effectively zero".

II. Using Single-Constraint Manifolds to Construct the Lowest-Dimensional Manifold Containing The Data Relation Between Singular Value Magnitudes/Uncertainties and Constraint Equations Before discussing the final details of the algorithm, we state some important preliminaries.

If eigenvalues and singular values are sorted similarly (in decreasing order, for example), then their associated eigen-/singular vectors are identical to within a + or − sign that is essentially irrelevant. For this reason, it is sufficient to consider singular vectors only in the following analysis.

When multiplying a matrix times any of the singular vectors obtained from the singular value decomposition of the matrix, the result is a vector whose length is the singular value corresponding to the singular vector in question. Each component of the resulting vector is the product of the corresponding row of the original matrix times the singular vector in question.

Accordingly, if a singular value from the decomposition of our design matrix (discussed earlier) is 0, the product of every row of the design matrix times the singular vector in question must be 0, and the singular vector in this case is like the vector C mentioned earlier (with components $(C_1, C_2, \ldots, C_N)$), where $\Sigma_{i=1}^{N} C_i\, f_i(P_j) = 0$ for all points $P_j$ (j=1 . . . N) used to construct the design matrix. In this case, we say that the singular vector in question corresponds to a constraint equation $f(P_j)=0$ relating the data.

When a singular value is not 0 but the data from which the design matrix was constructed are noisy and therefore imprecise, it is still theoretically possible for the associated singular vector to correspond to a constraint equation for the theoretical noise-free underlying data. However, as singular values become increasingly large relative to their associated uncertainties (i.e., to their associated standard deviations), it becomes increasingly unlikely that the singular vector in question really does correspond to a constraint equation.

Correspondence Between Constraint Equations and Associated Manifold Geometry

Constraint equations have geometrical interpretations here, and the set of all points satisfying a given constraint equation form a manifold (curve, surface, . . . ). For example, for three-coordinate (xyz) data, a constraint equation of the form ax+by+cz+d=0 represents a plane, which is a two-dimensional manifold (surface), and an equation of the form $(y-a)^2+(z-b)^2=0$ represents a line, which is a one-dimensional manifold (curve). The plane here corresponds to a single-constraint manifold: It is not possible to move from one point in the plane to an adjacent point in the plane by proceeding in the direction (a,b,c), which is normal to the plane. The line corresponds to a double-constraint manifold: y=a and z=b. Both y and z are constrained to particular values here.

For a single-constraint manifold, it is possible to determine the constrained direction for any point on the manifold by taking the gradient of the constraint function f(P) . (For more details, please see the discussion in the "Why Single-Constraint Manifolds?" section here.) For example, the gradient $(\partial/\partial x, \partial/\partial y, \partial/\partial z)$ applied to the function ax+by+cz+d does yield the correct constrained direction (a,b,c).

Constrained directions are described as being in the null space of [the tangent space of] a manifold, while allowed directions are in the range of a manifold. For the line example above, the y- and z-directions are in the null space, while the x-direction is in the range of the line.

Final Details of the Algorithm

Now returning to a description of the process, for each of the N singular vectors obtained from the decomposition of our design matrix, we then determine the gradient $\nabla f(P)$ (where $f(P)$ is $\Sigma_{i=1}^{N} C_i f_i(P)$, from before) at a specified base point $P=P_{base}$.

If associated singular values were essentially 0, as determined by the analysis outlined above, we set these values exactly to 0. Larger singular values are not changed.

We then multiply each of the N gradients $grad_j(j=1\ldots N)$ found above by a probability factor (for example, $\exp(-sval_j^2/(2\Delta sval_j^2))$, where $sval_j$ is the [possibly adjusted] jth singular value and $\Delta sval_j$ is the uncertainty [standard deviation] associated with $sval_j$). Multiplying by this factor has the effect of greatly suppressing the contributions from possible solutions that are statistically unlikely.

We now simultaneously consider the N [probability-weighted] gradients just obtained. For a d-dimensional coordinate space, the gradients are d-dimensional vectors, so that an N-by-d matrix can be formed from the N probability-weighted gradients. We now perform a singular value (or eigenvalue) decomposition on this N-by-d matrix, and this yields d singular values.

The values that are clearly non-zero correspond to singular vectors that span the space spanned by the weighted gradients. I.e., these singular vectors span the null space of the data set (at the base point), and the number of these vectors is the dimension of the null space, which is equal to the number of constraints on the data set.

The other singular vectors correspond to singular values that are essentially 0. ("Essentially zero" is determined by a two-step "input/output" analysis, i.e., perturbed data points $P_j \rightarrow$ vector uncertainties in weighted gradients $\rightarrow$ uncertainties in singular values obtained from decomposition of N-by-d weighted gradient matrix. This is followed by a statistical screening to compensate for the value of N, i.e., the risk of "false alarms", as outlined earlier). These essentially-0-valued singular values correspond to singular vectors that are orthogonal to the null space of the manifold, so these singular vectors represent the tangent space description of the manifold.

EXAMPLES

We conclude this section with some simple examples in three-coordinate (xyz) space.

A line might be found as the intersection of two distinct planes. Each plane would correspond to a single distinct constraint, and the line would represent a (one-dimensional) manifold with two distinct constraints.

Data degenerating to a single point might be described as the intersection of three distinct planes, each corresponding to a distinct constraint. The point would then represent a (zero-dimensional) manifold with three distinct constraints.

Points from a circle with $x^2+y^2=1$ and $z=0$ might be found as the intersection of the cylindrical surface with $x^2+y^2=1$, $z=$anything, and the x-y plane with $z=0$. Each surface here would correspond to a single-constraint manifold, and the circle would represent a (one-dimensional) manifold with two distinct constraints.

Additional surfaces might also be found passing through the points from the circle above (e.g., spherical or conical surfaces). For all of these extra surfaces, however, the normal (constraint) information would be found to be redundant with the constraint information already obtained from the plane and cylindrical surface above. Specifically, the normal to any one of these extra surfaces would be seen to be a linear combination of the plane and cylinder normals already found, and so the final determination of the intrinsic dimensionality and tangent space of the data would be unaffected.

Why Single-Constraint Manifolds?

In a three-dimensional xyz space, consider the line in the x-direction with $y=2$ and $z=3$. Think of this line as the intersection of two planes described respectively by the constraint equations $f_1$, and $f_2$ below, where $f_1$, describes the single constraint $y=2$ and $f_2$ describes the single constraint $z=3$.

$$f_1(x,y,z)=0*x+1*y+0*z-2=0$$

$$f_2(x,y,z)=0*x+0*y+1*z-3=0$$

$\nabla f_1=(\partial/\partial x, \partial/\partial y, \partial/\partial z) f_1=(0, 1, 0)$, i.e., the normal to the first plane.

$\nabla f_2=(\partial/\partial x, \partial/\partial y, \partial/\partial z) f_2=((0, 0, 0)$, the normal to the second plane.

The two normals are distinct and span a 2-dimensional space that is orthogonal to the line. We say that the dimension of the orthogonal space (nullspace) is two here, so that the dimension of the (lowest-dimensional) manifold containing the points on the line is embedding dimension − nullspace dimension =

= total # of coordinates − nullspacedimension =

= 3 − 2 = 1, which is correct for a line. $\checkmark$

If we tried to simultaneously incorporate the two constraints into a single equation, we would get something representing a less-than-D-1-dimensional manifold.

For example, to simultaneously require $y=2$ and $z=3$, we would need an equation of the form $$(y-2)^2+(z-3)^2=0$$

or $$(y-2)^2+(z-3)^4=0$$

or

. . .

If we tried $(y-2)+(z-3)=0$, we would really have $y+z-5=0$, which is not the equation for a line but is the equation for a plane.

Looking at the original $f(x,y,z)=(y-2)^2+(z-3)^2=0$, we see that $$\nabla f=(\partial/\partial x, \partial/\partial y, \partial/\partial z)f=(0, 2(y-2),2(z-3))$$

However, since $y=2$ and $z=3$ everywhere along the line, we have $\nabla f=(0, 0, 0)$ everywhere along the line, and this represents an unrestrictive gradient.

The equation $(y-2)^2+(z-3)^2=0$ represents the equation for a D-2-dimensional manifold here (two independent constraints), but from a gradient analysis point of view, the equation here is not very useful.

4. Detailed Description of the Tangent Space Determination and Fitting Process

Now to describe the process more particularly, given a "base" point at (without loss of generality)$0 \in \Re^d$ (for a d-dimensional embedding, $2 \leq d \leq 10$, perhaps, where $\Re$ represents the Real numbers), we ask if a discrete set of points $S=\{X_j\}_j$ in its neighborhood are (apparently) confined to some lower-dimensional manifold, and, if so, what their tangent space at this base point is.

In the context of analyzing nonlinear dynamical systems, we do this for two reasons. First, we wish to ensure that meaningless, noise-dominated "dimensions" are associated with Lyapunov exponents that are identified and suppressed (to leave only meaningful exponents). Second, it is important that meaningful principal axes near the base point of each neighborhood's computation not be mixed (by linear combinations) with meaningless axes when the displacements happen to evolve with similar exponents. (In this case, the basis could mix such axes freely, because the parts of the basis describing dynamics with equal exponents is a completely arbitrary basis of the subspace—an arbitrary linear combination of the "true" basis vectors, i.e., those tracking the actual dynamics, and those identifying noise.)

This application, analyzing a (possibly fractal) attractor of a nonlinear dynamical system, is the primary focus of the invention. In places, it will therefore be convenient to be aggressive in identifying or inferring tangent-space directions, conservative for their orthogonal complement (the constrained, i.e., "null-space", directions). That is, directions for which the evidence is ambiguous (because of the placement or uncertainty of available data) may be preferentially identified as part of the "tangent space" instead of the "null space". This can be desirable because inferring a null-space direction is equivalent to concluding that the data satisfy a constraint—a strong assertion.

A secondary consideration comes from determining the full equation for a tangent space. Under certain common circumstances, the additive constant or offset of the tangent space from a given data point provides an estimate of the error in the data point itself (at least in the null-space directions). Subtracting this estimate corresponds to filtering the point onto the manifold.

Throughout, one must be careful in distinguishing between "absence of evidence" and "evidence of absence." In some parts of the following mathematical analysis, the first of these will be helpful; in others, the second.

Formal Solution: Noise-Free Data

The practical solution proceeds in stages, starting from that for a large, if still finite, number of noise-free data. In this ideal case as mentioned above, the solution has two steps:

(1) From some large class of "reasonable" choices (a Hilbert space), determine all solutions of a certain constraint equation consistent with the given data; and
(2) from the set of all such solutions, extract the linearly independent descriptions (coefficient vectors) of the tangent space.

The former may be effected by conventional curve-fitting, as by least-squares (e.g., through the singular-value decomposition algorithm, "SVD"); however, the requirement of finding "all" solutions means that this problem—unlike the conventional one—is not overdetermined. The latter requires finding a basis for the null space among all of the solutions—for which SVD will also prove convenient. (The tangent space consists merely of all vectors orthogonal to this null space.)

We begin by considering "reasonable" constraint equations. First, check if all neighborhood data fit (practically) any continuous functional form, even implicitly, in terms of a (row-)vector-valued function $f$. The function must be a sum of n linearly independent basis functions $<f_j>_j$ (i.e., principal components of a function-space linear representation):

$$f(x_i, y_i, z_i) a = a_0 + a_1 f_1(x_i) + a_2 f_2(y_i) + a_3 f_3(z_i) + \ldots = 0,$$

an equation which is linear in the row-vector $a^T = <a_j>_j$, where (for notational convenience) we take the embedding dimension $d=3$, and the neighborhood data then to be $\{X_i = <x_i, y_i, z_i>\}_i$, a set of precisely n elements (row-vectors). Thus, for a given $f$, a is a transform of the data, albeit one that is nonlinear in the data. In this case, if 0 (the base point) is itself one of the data, we must have $a_0 = 0$. It is convenient to index the basis functions $f_j$ beginning with $j=0$. Without loss of generality ("WLOG"), then, adopt basis functions such that $f_j(0) = \delta_{j,0}$ (for all $j>0$)—the Kronecker delta;
$\nabla f_j(0) = \delta_{j,k}$ (all j; each k in 1 . . . d); and
$\nabla f_j(0) = 0$ (j>d+1).

For example, $$a_0 + a_1 x + a_2 y + a_3 z + a_4 x^2 + a_5 xy + a_6(\cos z - 1) + a_7(\sin xz - xz) = 0$$

where each basis function $f_j$ is the expression that has been multiplied by $a_j$.

We choose to filter the data to determine if there is a lower-dimensional manifold, using principal components analysis (PCA), or, equivalently, singular-value decomposition (SVD). To wit: We try to find $\alpha = <a_j>_j$, a set of n coefficients, not all zero, such that $$F(S) [a_0\, a_1 \ldots a_n]^T = 0, \text{ for}$$

$$F(S) = [1\ 0\ 0 \ldots 0;\ 1 f_1(x_1) f_2(y_1) f_3(z_1) \ldots ; \ldots ;\ 1 f_1(x_n) f_2(y_n) f_3(z_n) \ldots],$$

where ";" separates the rows—i.e., $$F(S) = \begin{bmatrix} 1 & 0 & 0 & \ldots & 0 & ; \\ 1 & f_1(x_1) & f_2(y_1) & f_3(z_1) & \ldots & ; \\ \vdots & \vdots & \vdots & \vdots & \vdots & ; \\ 1 & f_1(x_n) & f_2(y_n) & f_3(z_n) & \ldots & \end{bmatrix},$$

the design matrix of the linear fit. WLOG, we take $|\alpha|=1$.

At this point (we write F for $F(S)$ when convenient, and $F(.)$ for the matrix-valued function, if necessary), we factor F using singular-value decomposition: $F = U_F W_F V_F^T$. ($W_F$ is a diagonal matrix of the singular values, which are non-negative; the columns of U form an orthonormal ["o.n."] basis of the function space and constitute the principal components of F; the columns of V are the singular vectors of F, also an o.n. basis of the coefficient space, in this case.) Then we form some pseudo-inverse $W_F^\dagger$ (diagonal) for $W_F$, such that:

$(W_F)_{kk} = 0 \Rightarrow W_F^\dagger{}_{kk} = 0$, and $(W_F)_{kk} >> $ "noise" on the data $\Rightarrow W_F^{554}{}_{kk}(W_F)_{kk} \cong 1$.

(Note that for any definition of the pseudo-inverse "†", the "effective" rank of W can be defined as the trace of $W^\dagger W$, which is often more meaningful than a mere count of the number of its non-zero eigenvalues.)

Thus, we seek any non-zero vector(s) $\alpha \in NS(F)$, the null space of F. Since this means $F\alpha = 0$, or $U_F W_F V_F^T \alpha = 0$, and since $U_F$ is an orthonormal basis (recall that F is square), we must have $$\alpha \in NS(W_F V_F^T).$$

The vector α therefore consists of a (any) linear combination of the columns of $V_F$ that correspond to singular values equal to zero in $W_F$. The number of linearly independent solutions for α is the number of such columns of $V_F$, precisely the number of null singular values in $W_F$—which, in turn, is just the co-rank of F, n-rank(F).

Adopting (for now) the Moore-Penrose pseudo-inverse for "†", we have that $W_F^\dagger W_F$ is a diagonal matrix of zeroes (for NS(F)) and ones. (Conventionally, SVD algorithms order the singular values in $W_F$ in decreasing order, so diag($W_F^\dagger W_F$) consists of all the ones, then all the zeros; we shall assume such an algorithm here, whenever convenient for exposition.) Then $(I-W_F^\dagger W_F)V_F$ consists of precisely an o.n. basis of NS(F), prefixed with some null vectors (as many as the number of non-zero singular values of F, i.e., its rank).

Notice that the first row of $V_F$ "matches" the constant function $f_0$. (That is, the constant part of f(.) is given by $U_F W_F$ times the transpose of this row.) Likewise, the next d rows of $V_F$ match the linear basis functions—whose coefficients in α are precisely the derivatives at the origin of f(.)α, the functional fit specified by α. Now we extract the first-derivative columns of $(I-W_F^\dagger W_F)V$ into a matrix A, and observe that A consists of length-d column vectors, the first rank(F) of which are zero.

Distinct nonlinear fits may have identical or linearly dependent solutions for the linear coefficients (although not, of course, for α, the complete vector of coefficients). That is, rank(F) may be as large as n, but rank(A) cannot possibly exceed the number of its rows, which is only d. Thus, linearly independent columns of A describe distinct directions (at the origin) in which the manifold does not extend: the orthogonal complement of the tangent directions.

Now we use SVD again, to find those linearly independent columns of A. This determines the rank and the linear equations for the tangent space (notice that the rank may equal d, if the data really extend in all directions around the base, even after fitting to the nonlinear functions—but we will still call the result a "tangent" space, albeit a trivial one, consisting only of {0})):

$$A = U W V^T,$$

$$\text{rank}(A) = \text{rank}(W).$$

The diagonal elements of W in each of A's principal directions inversely determine whether the data "really" extend in the direction: Large diagonal elements correspond to directions that do annihilate—are orthogonal to—the (linear approximation to the) data. And the principal directions are precisely the columns of U. (Infinitesimal displacements from the origin are d-dimensional vectors, so notice that they must pre-multiply A, because A is d×n.)

We are thus led to form the projection for the tangent space:

$$P = I_d - AA^\dagger I_d = U W W^\dagger U^T = U(I_d - WW^\dagger)U^T,$$

which clearly has the required form for a projection: apart from a rotational similarity (i.e., U), it is diagonal with eigenvalues of zero and unity (or approximations thereto, depending on the definition of "†"); moreover, it preserves the vectors that A annihilates (i.e., the tangent space), and vice versa. This therefore has just the proper behavior, suppressing directions whose data-extents are small compared to the "noise", but leaving unaltered those that are well determined (extent much larger than the "noise").

For some purposes, this "projection" may be replaced with some other, qualitatively similar, matrix, such as $U \cos(-\pi WW^\dagger/2) U^T$. Most of the discussion below is unaffected by such a replacement.

It is convenient to be able to enforce dimensionality constraints in certain cases. For example, a certain direction may be known to lie in the tangent space, yet some data sets may favor inferring (erroneously) that it lies instead in the null space. There are several methods by which this prior information may be enforced. However, it will be important to use a method that applies appropriately to "noisy" data sets or even to (slightly) uncertain prior information, not only to logically certain cases. Accordingly, this topic will be deferred until we consider the problem of noisy data (below).

If the prior information concerns a null-space direction, on the other hand, it is trivial to form the projection matrix that annihilates this direction, and to multiply P by it.

Solution for Noisy Data

Suppose now that the $X_j$ vectors (or "points") contain additive, zero-mean, random noise of some distribution not yet specified. We revisit the formal (noise-free) solution, after normalizing the data set. Specifically, scale the set by the factor $$\phi = \max_k\{|X_k|\}, X_j \leftarrow X_j/\phi,$$

which produces a normalized data set whose largest-magnitude element has a squared norm equal to unity. For some scalar standard deviation σ>0, let the scaled (noisy) elements have Gaussian noise $\sim N[0,\sigma^2]$ (say), independent across points (and independent equal-variance across components, as the notation indicates). We assume $\sigma^2 \ll 1$.

Now we perturb every datum by approximately σ in every component, recompute A (or at least W) for every such perturbation, and note whether any imperfect fits, corresponding to initially non-zero singular values, can become perfect (zero). If so, then these additional fits are included, although discounted, according to the magnitude of perturbations (relative to σ) needed to produce them.

The Offset: Filtering the Base Point onto the Manifold

In principle, we could adjust all of the noisy points to minimize the sum of squared residuals (or some other convenient functional). The above development provides initial coefficients to achieve such a fit, but iteration would no doubt be needed. This would occur in the space of all coefficients jointly with all points' errors. Since the latter part alone is a space of nd dimensions, and the functional depends nonlinearly on the errors, the task would be computationally expensive. Even a single iteration could (depending on the iteration algorithm) involve numerically differentiating all of the n basis functions with respect to all of the nd scalar errors.

There is an important—and inexpensive—special case: the base point, if it is one of the data points. We can then content ourselves with estimating only the base point's error. As mentioned earlier, this is related to the offset of the tangent space from the origin: Like any linear function, the tangent space is described by a "slope" in each dimension (the direction vectors) and an intercept—the offset. Estimating this offset, and applying it to the base point is conceptually trivial—and, for the chosen basis functions, it is even computationally trivial.

Typically, we will translate the data to a neighborhood of the origin by subtracting one datum from all of the others. However, there is one important refinement. Although the offset's estimate is nominally accurate to second order, the base-point's error is the one error that appears in every other neighborhood point's error—simply because (in the common case) the base-point's position is subtracted from every other point in order to translate the base to the coordinate origin. As a result, it may be beneficial to subtract this estimate from the base point and repeat the translation-and-fit operation. Observe that this, unlike the general best-fit problem, is a low-dimensional iteration of inexpensive computations. The errors to be estimated constitute a d-dimensional space, and the functions are numerically evaluated once per iteration, rather than an nd-dimensional space with d+1 or more evaluations per iteration.

Enforcing Dimensionality Constraints

It may happen that we have prior information (of some significant, even perfect, certainty) that the tangent space or the null space includes a particular vector or set of vectors: a known subspace. For example, if the data are sampled from a dynamical flow, then the tangent space at the base point must include the local velocity vector—even if the data are sampled so coarsely that the above algorithm cannot initially reproduce this result. It is useful to extend the algorithm to combine this prior information with the "initial" results; for example, that the tangent space should include some vector that is approximately equal to an imperfectly estimated (or even perfectly known) local velocity vector.

There is a mechanism that generalizes easily to the case of uncertain prior information. Suppose, for example, that the prior-information directions $\{P_j\}_j$ consist of null-space vectors (i.e., constraint directions) only. Then one can construct the "augmented" null-space basis matrix $$B'=[v_1, v_2, \ldots, P_1, P_2, \ldots],$$

where the $v_i$ are the null-space vectors inferred by the above procedure. Next extract an o.n. basis from this matrix; construct the corresponding basis matrix (by making each column one of the basis vectors); and multiply by its transpose to construct the null-space projection map (with or without considering base-point noise). Finally, construct the tangent-space map by subtraction from the identity matrix.

The solution for the case of prior information about tangent-space directions is virtually identical, relying instead on augmenting the initial tangent-space basis matrix.

Observe that this technique, constructing an o.n. basis from the augmented matrices, ensures that any redundant information, either among the prior directions or between them and the initial (data-determined) directions, is automatically removed. It also ensures that the magnitudes of the $\{P_j\}_j$ are ignored in constructing the revised null space: This is proper, because these vectors are only supposed to identify directions.

It remains to show how to incorporate uncertain prior information. At heart, this entails using the magnitudes of the prior-information vectors, compared to the magnitudes of the initial estimates; the latter are given by the o.n. basis vectors, each multiplied by its corresponding "certainty," which will be a weight constructed from how close to zero its corresponding singular value is.

It is important that this "certainty" reflect the statistical significance of the solution (zero, or near-zero, singular value) given the number of data and number of basis functions.

In this case, assume that each direction-vector, whether prior (p') or data-determined (u'), is scaled by its "certainty". Specifically, we set its length (i.e., norm) so that its norm multiplied by its (angular) error is just equal to σ. Now form the augmented matrix B' as before, and perform SVD on the result:

$$B'=U_B W_B V_B.$$

In this case, however, we do not simply extract the principal components in $U_B$ that correspond to non-zero singular values in $W_B$. Rather, in keeping with the earlier uses of SVD when dealing with noise, we determine the singular values that are irrelevantly small, suppressing the corresponding column-vectors in $U_B$. We retain only the remaining, "substantial" vectors, those that (we can "confidently" assert) impose true constraints on the data, and thus define the null space.

As before, we form the null-space projection from the matrix consisting of a row of all these column-vectors; finally, we construct the tangent-space matrix by subtraction from the Identity matrix.

An Application

Consider the attractor of the Rossler chaotic dynamical system. This system is so strongly dissipative that the manifold (attractor) is extremely thin (~$10^{-20}$ of its height and width) virtually everywhere: Although topologically a three-dimensional ("3-D") system, its Lyapunov dimension is 2.02. Therefore, most neighborhoods are much too thin to permit realistic measurement of the correct (topological) dimension. However, estimation of this system's dynamics would demand the correct dimension, since that is precisely the number of Lyapunov exponents of the system: The wrong number would be a qualitative error destroying the integrity of the dynamics.

The solution begins by noting that the topological dimension is independent of position on the attractor. Therefore, it suffices to find one neighborhood on which the three-dimensionality is reliably measured.

Notice that this is actually a generic rule: Dissipation can make any attractor appear to be lower-dimensional than it truly is, but never higher-dimensional. Proper accommodation for noise is important, however, since noise can only increase the apparent dimension over its correct value. The Rossler system (like many others), though, exhibits its chaotic dynamics over the global scale of its attractor. Consequently, even a very noisy rendition of the attractor (say, signal/noise~5) is sufficient to show the "stretch-and-fold" nature of the dynamics, with the consequent Cantor-set structure of the attractor.

Specifically, where the attractor "folds over" and collapses onto itself, it cannot be represented as 2-D (even with high noise); but it can be represented as 3-D, if the embedding dimension (number of coordinates) is sufficiently high.

5. Examples of Fits

Figure 3:
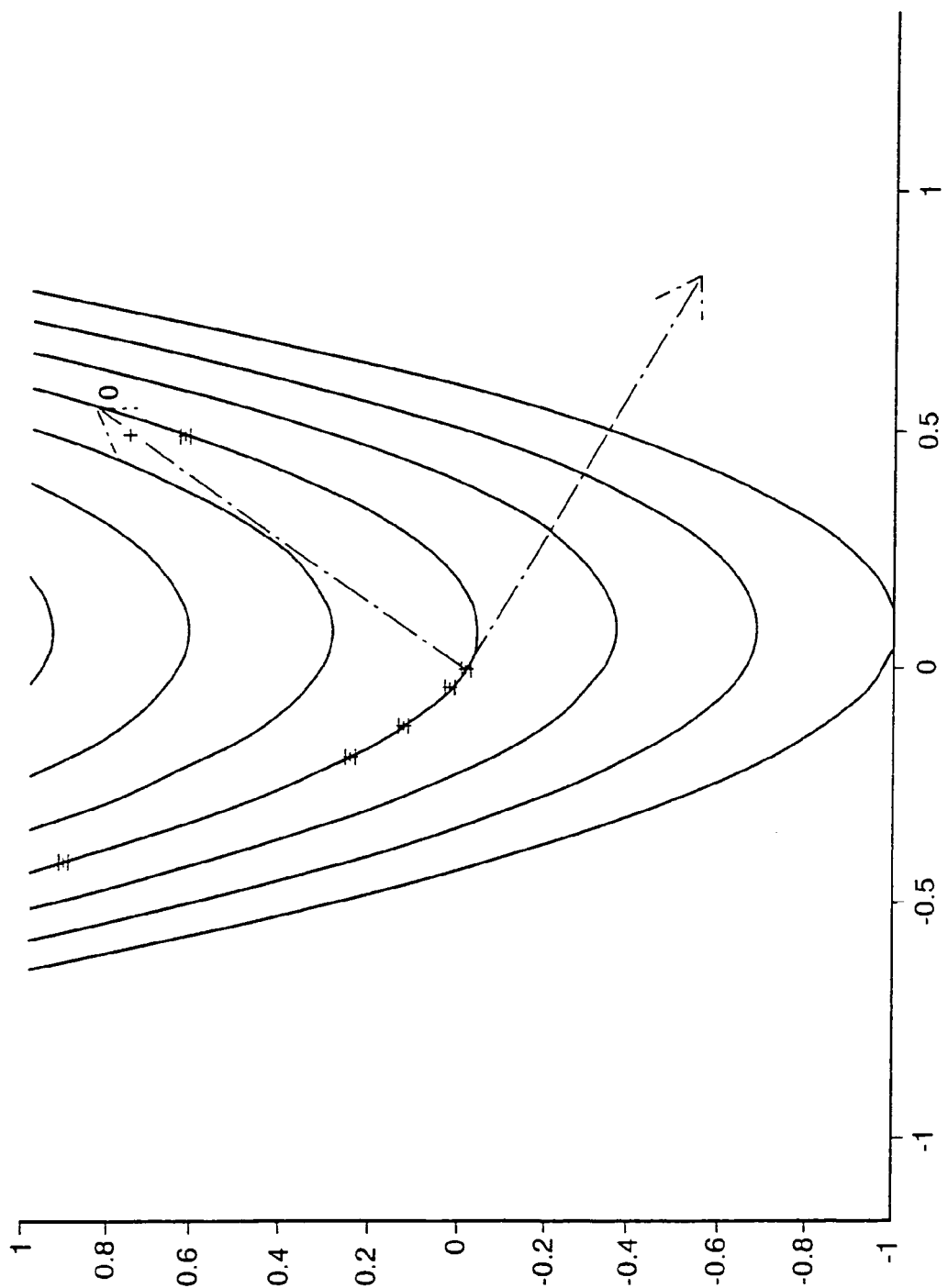
FIG. 3 is a plot showing how the technique works in the ideal case of fitting data that happen to be quadratic using second-order, or quadratic, basis functions.

FIG. 3 is an illustration of the ideal type of fit which can be made to perfect data. The data points, indicated by the "X"'s, were generated using a quadratic, i.e., second-order, function. Quadratic functions were also used as the fitting functions. The tangent space was determined at the point (0,0); the downward sloping arrow indicates the direction of the tangent line, the upward sloping arrow the direction of the null space. The notation diag (0.028, 1.000) indicates a "thickness" of the tangent space, i.e., an indicator of how scattered or extended the algorithm estimates the data to be, in the direction perpendicular (or parallel, respectively) to the tangent line. In this case, the data support high confidence that the manifold is thin (scatter estimated at 0.028 units) in one direction, the constrained one; and extends indefinitely (about 1.000 unit, approximately the full radius of the data set) in the orthogonal direction, the tangent.

Figure 4:
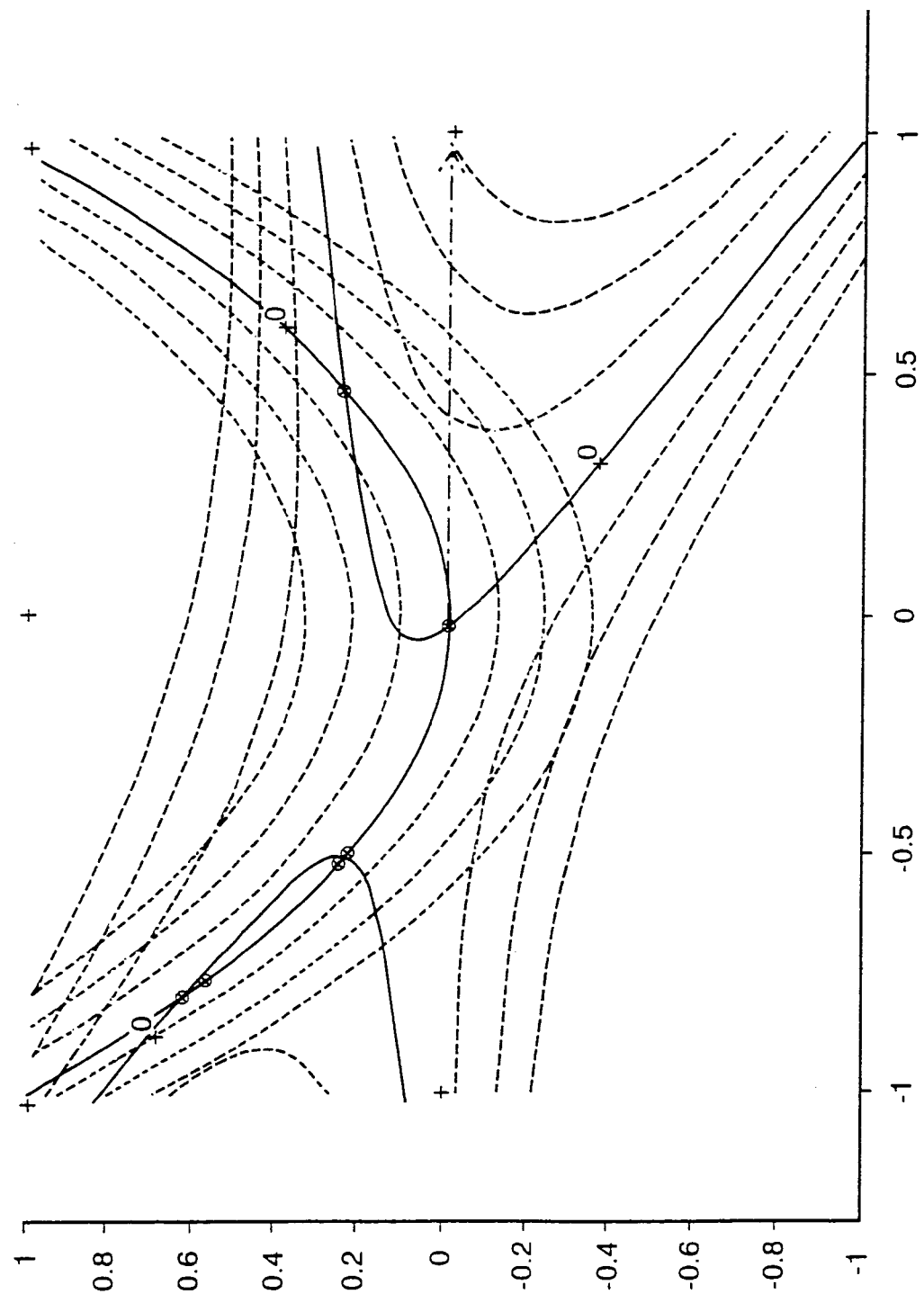
FIG. 4 is a similar plot with "clumpier" data.

FIG. 4 is a similar plot for "clumpy" data. The estimates are still robust with a relative noise level (scatter in the constrained direction) estimated to be 0.005. Even though a second "fit" is shown, it is sufficiently poor compared to the first fit that it has virtually no effect on the estimates. (The zero contour for each fit is labeled with "0" next to a "+" on the contour.) The two direction arrows have been multiplied by the estimated scatter or extent, 0.005 and 1.000, with the result that the null-space direction's arrow is invisibly small.

Figure 5:
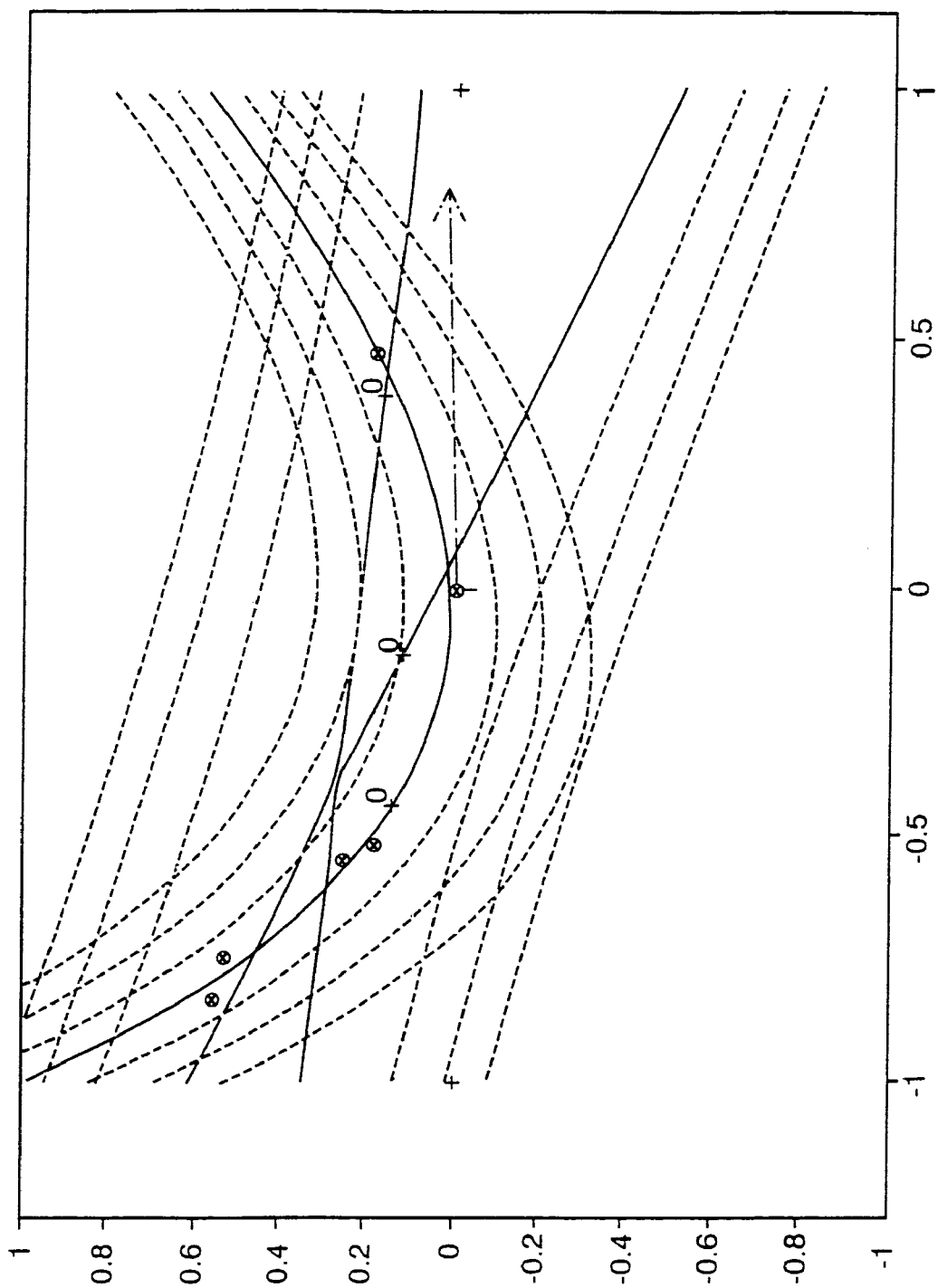
FIG. 5 shows how well the technique can be used to fit noisier data.

FIG. 5 shows how well the algorithm detects the tangent line even with much noisier data. The directions are accurately estimated. The computed scatter ("noise level") in this case is 0.04 in the true constrained direction, and the extent drops only to 0.80 (still approximately the radius of the data set) in the true tangent direction. The two arrows have again been multiplied by the estimated scatter or extent.

Figure 6:
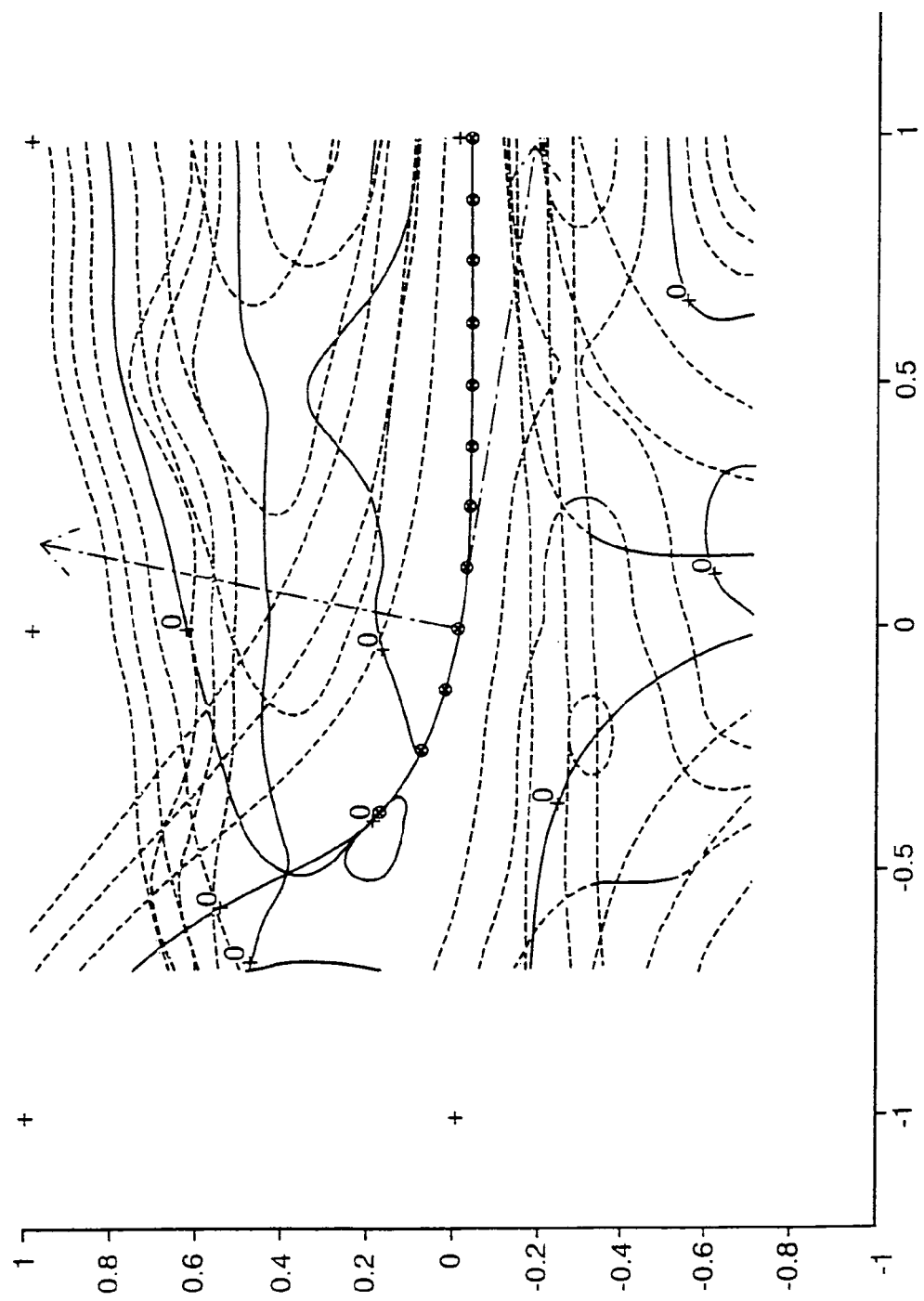
FIG. 6 is a plot showing how the technique may fit the tangent line of a fourth-order, or quartic, function using only a set of second-order, or quadratic, basis functions.

FIG. 6 shows the results of a fit to a general constraint, one which lies outside the space of the basis functions. Again, the fits that were found (three in this case, with their zero contours marked as before) produce an accurate estimate of the tangent line, even though no fit could match the true function (a quartic in this case) anywhere except on the specific 13 data points. Once again, the data are estimated to extend 1.000 unit in the tangent direction and only 0.001 unit in the orthogonal direction.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A computer method for generating an indication representing behavior of a real-world system based on an estimate of the topological dimension of a manifold, the method comprising:
   accepting data points representing a response of the real-world system, each data point having the same number of coordinates, the data points lying on the manifold or within a given error of the manifold;
   identifying fits to the points which are in a neighborhood of a base point, in which the gradient of each fit at the base point identifies a constrained direction;
   estimating the number of constraints in the neighborhood of the base point to be the same as the number of such constrained directions that are linearly independent;
   altering the estimated number of constraints using prior information about the real-world system;
   estimating the topological dimension of the manifold to be the number of coordinates of each of the data points minus the altered estimated number of constraints;
   generating the indication representing behavior of the real-world system based on the estimated topological dimension; and
   presenting the generated indication representing behavior of the real-word system to a user from a computer.

2. The computer method as in claim 1 wherein the real-world system is one of a pathological vocal system, econometric system, signal processing system, and demographic system.

3. The computer method as in claim 1 wherein the fits to the data points are identified using a matrix decomposition technique to find singular values and singular vectors, or eigenvalues and eigenvectors, of a design matrix constructed from the data points.

4. The computer method as in claim 3 wherein each fit is a linear combination of basis functions for which curves that have value zero pass near the data points and of coefficients multiplying the basis functions.

5. The computer method as in claim 4 wherein the coefficients are obtained from a singular value decomposition (SVD) of the design matrix.

6. The computer method as in claim 4 wherein the coefficients are obtained from an eigenvector decomposition of the design matrix and its transpose.

7. The computer method as in claim 1 wherein estimating the number of constraints further comprises:
   weighting the gradients by a factor that depends upon an uncertainty level in the data points.

8. The computer method as in claim 1 wherein estimating the number of constraints further comprises:
   weighting the gradients and prior information by factors that depend upon uncertainty levels in the data points, the prior information, and a set of basis functions.

9. The computer method as in claim 1 wherein the altering the estimated number of constraints includes reducing the estimated number of constraints by excluding directions not among those known to be constrained.

10. The computer method as in claim 1 wherein the data points near or at the base point are filtered or projected in such a way as to satisfy constraints in the neighborhood of the base point.

11. The computer method as in claim 1 further comprising identifying fits to the data points and estimating the number of constraints in the neighborhood of additional base points to infer additional information about the manifold.

12. The method as in claim 1 wherein the given error is approximately one standard deviation of noise associated with the data points.

13. A data processing system that provides an estimate of a topological dimension of a manifold, the system comprising:
   a data acquisition unit configured to receive a set of data points that lies on the manifold or within a given error of the manifold, each data point having the same number of coordinates;
   a processor configured to:
      identify fits to data points in the set of data points which are in a neighborhood of a base point, where the gradient of each fit at the base point identifies a constrained direction;
      estimate the number of constraints in the neighborhood of the base point to be the same as the number of such constrained directions that are linearly independent;
      alter the estimated number of constraints using prior information about a real-world system;
      estimate the topological dimension of the manifold to be the number of coordinates of the data points minus the altered estimated number of constraints; and
   a user interface configured to present the estimated topological dimension to a user.

14. The data processing system as in claim 13 wherein the data acquisition unit includes a microphone that acquires speech signals and an analog-to-digital converter that provides a digital representation of the acquired speech signals.

15. The data processing system as in claim 13 wherein the data acquisition unit acquires data via the user interface without the user specifying either the complexity or order of the manifold defined by the set of data points.

16. The data processing system as in claim 13 wherein the processor is further configured to use a matrix decomposition technique to find singular values and singular vectors, or eigenvalues and eigenvectors, of a design matrix formed from basis functions constructed from the set of data points.

17. The data processing system as in claim 13 wherein the processor is further configured to weight the gradients and prior information by factors that depend upon uncertainty levels in the set of data points, the prior information, and, optionally, a set of basis functions.

18. The data processing system as in claim 13 wherein the processor is configured to alter the estimated number of constraints by excluding directions not among those known to be constrained.

19. The data processing system as in claim 13 wherein the processor is further configured to filter or project data points in the set of data points near or at the base point in such a way as to satisfy constraints in the neighborhood of the base point.

20. The data processing system as in claim 13 wherein the given error is approximately one standard deviation of noise associated with the set of data points.

* * * * *